United States Patent [19]

Asano

[11] Patent Number: 4,487,472
[45] Date of Patent: Dec. 11, 1984

[54] LIGHT BEAM SCANNING APPARATUS
[75] Inventor: Eiji Asano, Sakai, Japan
[73] Assignee: Minolta Camera Kabushiki Kaisha, Osaka, Japan
[21] Appl. No.: 394,831
[22] Filed: Jul. 2, 1982
[30] Foreign Application Priority Data Jun. 7, 1981 [JP] Japan .................... 56-106061

[51] Int. Cl.³ .................. G02B 27/17; G01D 9/42
[52] U.S. Cl. ..................... 350/3.71; 346/108; 350/6.2
[58] Field of Search ............ 350/3.71, 6.2; 346/108; 358/205

[56] References Cited

U.S. PATENT DOCUMENTS

| 3,922,059 | 11/1975 | Noguchi | 350/3.71 |
| 4,040,737 | 8/1977 | Masaki et al. | 355/49 |
| 4,106,844 | 8/1978 | Bryngdahl et al. | 350/3.71 |
| 4,165,464 | 8/1979 | Ikeda et al. | 350/3.71 |

FOREIGN PATENT DOCUMENTS 52-120846 10/1977 Japan.
55-45004 3/1980 Japan.

Primary Examiner—John K. Corbin
Assistant Examiner—William Propp
Attorney, Agent, or Firm—Jackson, Jones & Price

[57] ABSTRACT

The present invention includes a rotable disk type of hologram which deflects an incident light beam such as a laser into an intermediate scanning path of a curvilinear configuration. An extended prism provides a variable incident angle surface for refracting the incident curvilinear configuration into substantially a linear scan path on an object surface.

12 Claims, 8 Drawing Figures

LIGHT BEAM SCANNING APPARATUS

BACKGROUND OF THE INVENTION

1. Field of the Invention

The present invention relates to an apparatus for scanning the surface of an object with a deflected laser beam or like light beam, and more particularly to a light beam scanning apparatus wherein diffraction gratings are used for deflecting the light beam.

2. Description of the Prior Art

In recent years, apparatus for linearly scanning the surface of an object with a light beam have been placed into use for facsimile systems and laser beam printers. Various forms of scanning apparatus have been proposed for these applications. While such scanning apparatus, heretofore known, generally comprise a polygonal rotary mirror or an oscillating mirror for mechanically deflecting a light beam, apparatus have also been proposed wherein a disk type hologram scanner having a plurality of diffraction gratings are used for optically deflecting a light beam. For example, a scanning apparatus including a disk type hologram scanner is disclosed in Japanese Laid-Open Patent Application No. SHO 52-120846 based on U.S. patent application Ser. No. 673,183 filed on Apr. 2, 1976.

The disk type hologram scanner comprises a disk formed with diffraction gratings exactly identical in construction and radially arranged equidistantly along the periphery of the disk. When a laser beam is caused to strike on the diffraction gratings while the disk is in rotation, the beam is deflected by diffraction for scanning. With this apparatus the scanning locus of the light beam on the surface of the object is curved in the form of a circular arc. The apparatus of the Japanese application (No. SHO 52-12086) therefore employs a lens provided between the disk and the object for correction purposes.

Another Japanese Laid-Open Patent Application No. SHO 55-45004 proposes the use of a concave mirror having a suitable curved section, such as a circular arc or elliptical section, as a means for correcting the scanning locus into a straight line.

U.S. Pat. No. 3,922,059 and U.S. Pat. No. 4,040,737 are cited respectively to disclose a hologram for deflecting a circular scanning line and a rotary mirror.

However, such lens or concave mirrors, are difficult to make and expensive and accordingly the prior art is still seeking improvements in this field.

SUMMARY OF THE INVENTION

Accordingly the main object of the present invention is to provide an improved light beam scanning apparatus.

Another object of the invention is to provide an arrangement of a simple construction for correcting the scanning locus of a light beam scanning apparatus in which a disk type hologram scanner is used.

The above and other objects of the invention can be accomplished with the use of an elongated prism as a correcting means. The prism is relatively easy to make, and the scanning locus can be corrected satisfactorily by the prism. The present invention also includes a rotable disk type hologram scanner for deflecting the incident laser beam. The disk includes a plurality of identical diffraction gratings radially arranged equidistantly along the periphery of the disk and a prism member operatively positioned along the optical axis to correct the scanning locus to a linear form.

The foregoing and other objects, advantages and features of the present invention will become apparent from the following description taken in conjunction with the accompanying drawings which illustrate a specific embodiment of the invention.

BRIEF DESCRIPTION OF THE DRAWINGS

FIG. 6b is an enlarged diagram showing the prism of FIG. 6a; and

In the following description, like parts are designated by like reference numbers throughout the several drawings.

DETAILED DESCRIPTION OF THE INVENTION

The following description is provided to enable any person skilled in the optical and printing field to make and use the invention and sets forth the best mode contemplated by the inventor of carrying out his invention. Various modifications, however, will remain readily apparent to those skilled in the art since the generic principles of the present invention have been defined herein specifically to provide a relatively economical and easily manufactured optical scanning apparatus.

Figure 1:
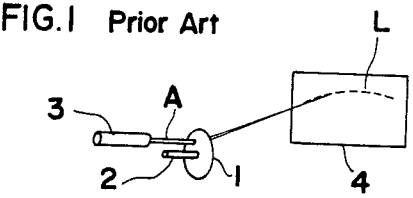
FIG. 1 is a diagram schematically showing a prior art light beam scanning apparatus including a disk type hologram scanner.
Figure 2:
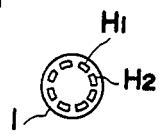
FIG. 2 is a plan view showing the prior art disk type hologram scanner.

FIG. 1 discloses a light beam scanning apparatus having a disk type hologram scanner, as shown in FIG. 2, incorporated therein. A laser beam, A, from a laser 3 strikes a hologram disk 1 rotating about an axis 2 and is deflected to scan the surface of an object, 4, as indicated by the broken line L. The locus of scanning, L, is in the form of a circular arc. As seen in FIG. 2, the hologram disk 1 has diffraction gratings H1, H2, etc. formed by a hologram and attached thereto to be arranged radially at equal circumferentially spacings. The term "arranged radially" means that when a specific direction is defined on the surface of each of the diffraction gratings H1, H2, ... Hn which are made exactly identical, the directions are arranged radially with respect to the center of the disk 1. The diffraction grating of the hologram disk has a diffraction image recorded on a photosensitive plate and formed by a bundle of parallel rays and a bundle of diverging or converging rays incident on the plate, wherein these rays are coherent to each other. When a handle of parallel rays is incident on the grating, the diffracted rays, converge at the point of divergence or convergence of the bundle of diverging or converging rays used for recording the diffraction image. When the apparatus is so constructed that the point of convergence of the diffracted rays is positioned on the object surface 4, the diffracted beam forms a circular arc scanning locus with the rotation of the hologram disk 1 as stated above.

Figure 3:
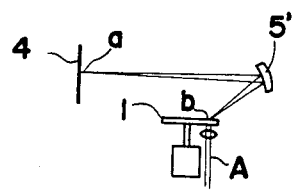
FIGS. 3 and 4 are schematic diagrams illustrating conventional methods of correction.
Figure 4:
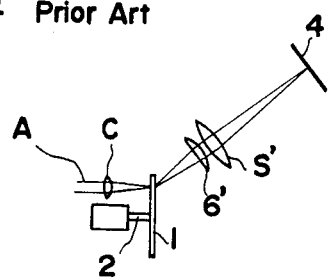

It is the object of the present invention to correct or modify the circular arc scanning locus to a straight line while eliminating excessive cost and production problems. FIGS. 3 and 4 show the conventional arrangements for this purpose. A cylindrical concave mirror 5' is used in the arrangement of FIG. 3. The cross sectional curve of the cylindrical mirror surface is in the form of an ellipse having, as its two foci, the point of convergence, a, of a light beam on the surface of an object, 4, and the point of diffraction, b, on a hologram disk 1. With the arrangement of FIG. 4, the light beam to be incident on a hologram disk 1, is converged by a cylindrical lens C, and the diffracted beam is corrected by a toroidal lens 6'. A spherical lens S' serves to converge the beam on the surface of an object, 4. Elliptical mirrors and toroidal lens such as these are very cumbersome to make.

In order to simplify, while still fulfilling the foregoing objects, the present invention utilizes a particular property of light involved in the refraction of light that is incident obliquely on a plane. More specifically the invention uses a prism for the correction of the scanning locus. While any prism may be usable, a regular elongated trigonal prism for use in spectroscopy or the like is used in the embodiment of the invention to be described below.

Figure 5:
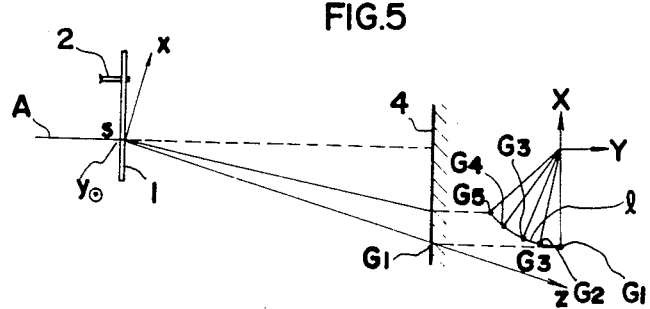
FIG. 5 is a diagram illustrating a plot of coordinates for a description of the invention.

The coordinate system applicable to the present invention embodiment will be described with reference to FIG. 5. The coordinate (X, Y) has an origin at an intersection with an object surface 4 of an extension of an incident beam A on a hologram disk 1. In FIG. 5, the diagram of a scanning locus 1 is shown on the plane of the drawing with the object surface 4 rotated through 90° toward the reader. Only a half of the locus is illustrated. Thus the hologram disk 1 deflects the incident light beam into an intermediate scanning path of a curvilinear configuration periodically extending on either side of the z-axis of FIGS. 5 and 6a.

The illustrated locus is divided into four equal portions, and the opposite ends and the divided points of the locus are represented by G1 to G5. The z-axis extends from the point of diffraction, s, as the origin along a diffracted beam sG1, the x-axis extends from the origin at a right angle with the z-axis in the plane of the drawing, and the y-axis extends from the origin toward the reader perpendicular to the plane of the drawing. In the embodiment to be described herein, the angular displacement of the light beam from point G1 to point G5 is 14°. The coordinates (x, y, z) of points G1 to G5 are as follows when sG1 = 1200 mm.

G1 (0, 0, 1200)

G2 (1.00575, 38.8206, 1199.372)

G3 (4.01976, 77.4968, 1197.488)

G4 (9.03018, 115,.8837, 1194.357)

G5 (16.01866, 153.8389, 1189.991)

Figure 6A:
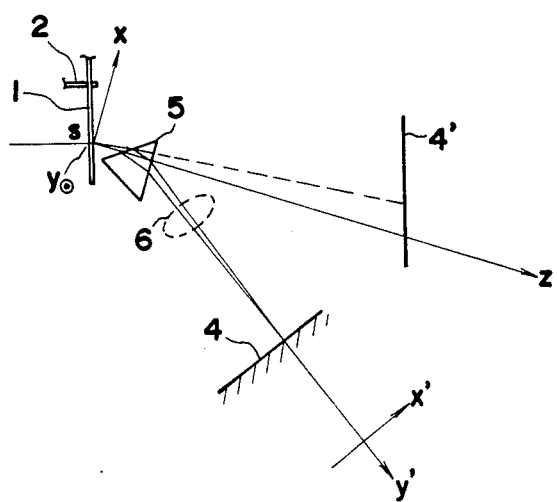
FIG. 6a is a side elevation schematically showing an embodiment of the invention.
Figure 6B:
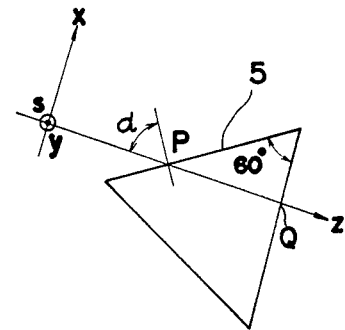
Figure 7:
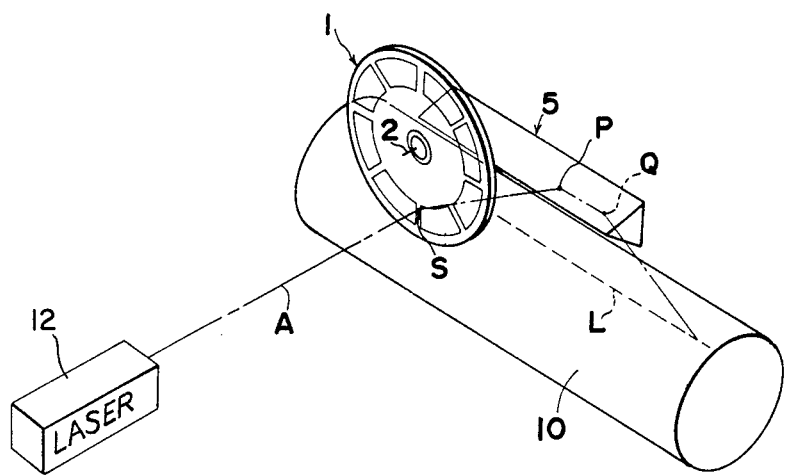
FIG. 7 is a perspective view showing an embodiment of the present invention specifically as it is used for scanning a photosensitive drum.

FIGS. 6a, 6b and 7 show an embodiment of the invention including a prism 5 to serve as a correcting means for providing a straight scan line. Indicated at 4' is the object surface shown in FIG. 5. Since the diffracted beam is refracted by the prism 5, the actual object surface 4 is shifted from the position 4'. The prism is made of a material having a refractive index of 1.52 and has a vertex angle of 60° as shown in FIG. 6b so that the angle of incidence, α, of the diffracted beam along the z-axis or the central optical axis defined in FIG. 5 will be 60.16752°. The angle of incidence will vary as the intermediate scanning path or scanning locus periodically tracks a path off of the z-axis.

The intersection P of the z-axis with the first incident surface face of the prism 5 and the intersection Q of the z-axis with the second egress surface face thereof will have the coordinates (x, y, z) of P (01, 0, 20) and Q (0, 0, 40). The arrangement is further such that the straight line of intersection of the image surface or the object surface 4 with the xz plane is represented by the equation.

$$-0.64941x + 0.76044z = 1200.$$

This relationship is dependent on the distance of convergence of the beam through the hologram disk and the position of the prism 5. The opposite ends and four equidistantly divided points of the scanning locus on the surface 4 are represented by G1' to G5'. When the beam is traced for calculation using a coordinate system on this object surface wherein the y'-axis parallel to the y-axis intersects the x'-axis at right angles at G1' as the origin, the coordinates (x', y') of G1' to G5' in mm are as follows:

G1' (0, 0)

G2' (0, 8.7768)

G3' (−0.0004, 77.5357)

G4' (−0.0037, 116.2554)

G5' (−0.0132, 154.9127).

Consequently, the x' coordinates representing the curving of the locus are −0.0132 < x' < 0, indicating that the locus is sufficiently linear for practical use.

Thus, the substantially linear periodic scan line is within the approximate range of the following equation:

$$|0.0132 \text{ mm}| \geq |X'| > 0$$

wherein X' is a coordinate representing an axis traverse to the plane of the desired scan line on the object surface. The ratio of deviation of the incident laser beam to the plane of the desired scan line from an uncorrected state to a corrected state is approximately in the range of 1200 to 1 in absolute values, for a distance of 1200 mm from the disk hologram to the scan path on the object surface.

Indicated in a broken line in FIG. 6a is a lens 6 interposed between the prism 5 and the image surface (object surface) and having suitable distortion characteristics, whereby the scanning beam can be made to perform a rectilinear motion at a uniform velocity on the scanning locus.

FIG. 7 shows the embodiment of the invention more specifically as it is used in scanning a photosensitive drum 10. As already described above, the scanning locus L shown is rendered sufficiently linear by an elongated prism that is extended parallel to the rotational axis of the drum 10.

The scanning operation is capable of forming on the drum 10 a latent electrostatic image, from for example, a laser source 12 which is processed by a known method for copying reproduction.

The present invention provides a linearity to the scanning locus merely by the use of a prism which is suitably arranged between a hologram disk and an image surface. The prism is exceedingly easier to make than the concave mirror and lenses heretofore used and therefore assures great advantages in the commercial field.

The particular prism is not limited to a trigonal one but rather various other prisms, such as a trapezoidal prism, are usable with the present invention.

Although the present invention has been fully described by way of examples with reference to the accompanying drawings, it is to be noted that various changes and modifications will be apparent to those skilled in the art. Therefore, unless otherwise such changes and modifications depart from the scope of the invention, they should be construed as being included therein.

What is claimed:

1. A light beam scanning apparatus comprising;
    a rotatable disk hologram scanner for deflecting the incident light beam and having a plurality of diffraction gratings exactly identical in construction and radially arranged equidistantly along the periphery thereof;
    an object surface on which the light beam is scanned; and
    a prism member suitably arranged on an optical axis between said hologram scanner and said object surface so that a scanning locus on said object surface is approximately corrected to linear form.

2. A light beam scanning apparatus as claimed in claim 1 wherein said prism member is a regular trigonal prism.

3. An improved light beam scanning apparatus for deflecting incident light into substantially a linear scan line on an object surface comprising:
    a rotatable disk hologram capable of deflecting an incident light beam along a central optical axis into an intermediate scanning path of a curvilinear configuration extending on either side of the central optical axis, and
    a prism having an incident surface for refracting the intermediate light beam from the hologram into a linear scan pattern on the object surface, the inclination of the prism surface relative to the optical axis providing a variable incident angle as the intermediate scanning path travels periodically off of the central optical axis in tracking a curvilinear configuration.

4. The improved light beam scanning apparatus of claim 3 wherein the incident light beam is a laser beam.

5. The improved light beam scanning apparatus of claim 4 wherein the prism has a refractive index of 1.52 and an angle of incidence along the central optical axis of approximately 60°.

6. The improved light beam scanning apparatus of claim 4 wherein the prism has an extended length parallel to the object surface.

7. In a laser beam printer capable of forming an image on an object surface such as a photosensitive drum, the improvement for deflecting an incident laser beam into substantially a linear scan line on the object surface comprising;
    a rotatable disk hologram having a plurality of diffraction gratings capable of deflecting an incident laser beam traveling along a central optical axis to provide a periodic scanning locus on the object surface, the deflection of the laser beam immediately after the hologram having an intermediate curvilinear configuration extending on either side of the optical axis, and
    prism means for varying the refraction of the intermediate laser beam from the hologram into a linear scan pattern on the object surface, the inclination of the prism incident surface relative to the optical axis providing a variable incident angle as the intermediate scanning path travels periodically off of the optical axis in tracking a curvilinear configuration.

8. In a laser beam printer capable of forming an image on an object surface such as a photosensitive drum, the improvement including a light beam apparatus for deflecting an incident laser beam into substantially a linear scan line on the object surface comprising:
    a rotatable disk hologram having a plurality of diffraction gratings capable of deflecting an incident laser beam traveling along a central optical axis to provide a periodic scanning locus on the object surface, the deflection of the laser beam immediately after the hologram having an intermediate curvilinear configuration extending on either side of the optical axis, and
    prism means for varying the refraction by angle of incidence of the intermediate laser beam from the hologram into a linear scan pattern on the object surface, the prism means including a prism, the inclination of the prism relative to the optical axis providing a variable incident angle as the intermediate scanning path travels periodically off of the optical axis in tracking a curvilinear configuration, the prism means further including an incident surface positioned to receive the laser beam traversing a periodic curvilinear configuration and an egress surface for passing the laser beam to provide a substantially linear traversing periodic configuration on the object surface, the index of refraction of the prism means being selected to provide the correction of the laser beam into a substantially linear periodic scan line.

9. The invention of claim 8 wherein the substantially linear periodic scan line is approximately within the range of the following equation:

$$|0.0132 \text{ mm}| \geq |X'| > 0$$

wherein X' is a coordinate representing an axis traverse to the plane of the desired scan line.

10. The invention of claim 9 wherein the index of refraction is approximately 1.52.

11. The invention of claim 8 wherein the egress surface is substantially perpendicular to the egressing laser beam.

12. The invention of claim 8 wherein the ratio of deviation of the incident laser beam to the plane of the desired scan line from an uncorrected state to a corrected state by the prism means is approximately in the range of 1200 to 1 in absolute values, for a distance of 1200 mm from the disk hologram to the scan path on the object surface.

* * * * *

UNITED STATES PATENT OFFICE
CERTIFICATE OF CORRECTION

Patent No. 4,487,472      Dated December 11, 1984

Inventor(s) Eiji Asano

It is certified that error appears in the above-identified patent and that said Letters Patent are hereby corrected as shown below:

On the Cover Sheet, beneath [30] Foreign Application Priority Data, delete "Jun. 7, 1981" and insert --July 6, 1981--.

Column 2, line 60, delete "handle" and insert --bundle--.

Signed and Sealed this

Tenth Day of December 1985

[SEAL]

Attest:

DONALD J. QUIGG

Attesting Officer        Commissioner of Patents and Trademarks